US005127429A

United States Patent [19]

Kempf et al.

[11] Patent Number: 5,127,429

[45] Date of Patent: Jul. 7, 1992

[54] METHOD AND DEVICE FOR DISTRIBUTING PUMPABLE THICK MATTER INTO SEVERAL DELIVERY PIPES

[75] Inventors: Manfred Kempf, Aich; Karl Schlecht, Stuttgart, both of Fed. Rep. of Germany

[73] Assignee: Putzmeister-Werk Maschinenfabrik GmbH, Aichtal, Fed. Rep. of Germany

[21] Appl. No.: 640,410

[22] PCT Filed: Jul. 8, 1989

[86] PCT No.: PCT/EP89/00788

§ 371 Date: Mar. 20, 1991

§ 102(e) Date: Mar. 20, 1991

[87] PCT Pub. No.: WO90/01094

PCT Pub. Date: Feb. 8, 1990

[30] Foreign Application Priority Data

Jul. 23, 1988 [DE] Fed. Rep. of Germany ....... 3825080

[51] Int. Cl.[5] .............................................. F16K 11/06

[52] U.S. Cl. ............................... 137/240; 137/625.11; 137/625.46; 137/874; 137/876

[58] Field of Search .............. 137/625.11, 874, 625.46, 137/624.18, 624.2, 240, 876

[56] References Cited

U.S. PATENT DOCUMENTS 2,555,367 6/1951 Peterson ..................... 137/625.11 X
2,827,924 3/1958 Towler ........................... 137/625.11
3,674,123 7/1972 Lewis ......................... 137/625.11 X
4,207,922 6/1980 Andrieux ........................ 137/625.11

FOREIGN PATENT DOCUMENTS 3229103 3/1984 Fed. Rep. of Germany .
3330892 3/1985 Fed. Rep. of Germany .
3506463 7/1986 Fed. Rep. of Germany .
2360726 3/1978 France .

*Primary Examiner*—Alan Cohan
*Attorney, Agent, or Firm*—Kenyon & Kenyon

[57] ABSTRACT

An apparatus for delivering sludge-type matter from a supply line has a manifold conduit rotatably coupled on one end to the supply line and adapted to receive matter flowing therefrom. A distributor plate includes a plurality of ports extending therethrough. A plurality of distributor conduits are each coupled on one end to a respective port on one side of the distributor plate to receive matter therefrom. A rotating plate is rotatably supported on the other side of the distributor plate and coupled to the other end of the manifold conduit. The rotating plate is adapted to rotate relative to the distributor plate to align the manifold conduit with a respective distributor conduit to direct the flow of matter therethrough. The rotating plate has a plurality of stop cams formed on the peripheral edge thereof, each corresponding in position to a respective distributor conduit. A catch member is biased against the peripheral edge of the rotating plate and, thus, is adapted to permit rotation of the rotating plate in one direction, but prevent rotation in the other direction upon abutting a respective stop cam. The manifold conduit is aligned with a respective distributor conduit upon the catch member abutting a respective stop cam.

11 Claims, 2 Drawing Sheets

20 30 28 18 21 22 24 20 26 30 20 16 14 10 30 20 12 32

10
12
14
16
18
20
21
22
24
26
28
28,30
30
32
34
36
38
40
42

43
32
56
62
60
58
48
28
26
30
18
20
52
54
54
66
68
64
20
14
70
20
12
50
46
44
16

METHOD AND DEVICE FOR DISTRIBUTING PUMPABLE THICK MATTER INTO SEVERAL DELIVERY PIPES

FIELD OF THE INVENTION

The present invention relates to methods and apparatus for distributing thick matter, for example, concrete, which is pumped through a supply line and into several delivery pipes.

BACKGROUND INFORMATION

A device for distributing sludge, which is used particularly in applications for building tunnels, is shown in German Patent No. 35 06 463. Several delivery pipes are adapted for connection by their unattached ends to the filler openings of a tunnel. The filler openings are staggered in both the circumferential direction as well as in the direction of the tunnel axis, and are capable of being pressurized one after the other with concrete. The ports of the delivery pipes face the pump, and are mounted by flanges on a distributor plate symmetrically with respect to the axis of rotation of the plate.

A swivel-mounted preferably S-shaped manifold is also provided, having a port which faces the concrete pump and is coupled by a rotating joint, which is coaxial with the axis of symmetry, to a feed-pipe connecting piece (or short feed pipe), leading to the pump, and including a second port, which is mounted by a flange to a connecting piece. The connecting piece is in turn mounted on a rotating plate, and extends through the rotating plate to the distributor plate. The rotating plate is rotatable about the axis of the feed-pipe connecting piece, relative to the stationary distributor plate, so that the connecting piece can be connected to the various ports of the delivery pipes.

The monitoring of the correlation between the position of the connecting piece and the desired delivery-pipe port is accomplished by means of an end-of-cam switch, or by means of an electrical proximity switch. It has been shown, however, that this measure alone is not enough to achieve an exact correlation. The friction between the rotating plate and the distributor plate varies depending on the application time and the wear that the device is subject to. Because of the variations in wear, material settles into wear zones. As a result, the friction characteristics existing at the various ports change, so that further rotation can cause the ports to become either overrun or underrun.

If the feed-through openings are not in exact or true alignment, an increased resistance to flow or even clogging can occur. When steel fiber concrete is pumped, another problem which can occur is that when the rotating plate is turned, a certain amount of steel fibers can become carried with the plate. The steel fibers settle in the rotation crack and build up layers of more or less important thicknesses therein. As a result, gaps develop, and the delivered concrete can bleed through the gaps. Due to the resulting loss in liquid, clogging can occur which, accordingly, can affect the operativeness of the device. This is particularly a problem when there is a free clearance space between the distributor plate and the rotating plate which, in turn, gradually becomes filled with emerging concrete. After the concrete hardens, the clearance space becomes clogged and, as a result, rotation of the plate is no longer possible.

It is an object of the present invention, therefore, to improve known devices of the type described above, for example, so that independent of the consistency of the viscous material to be delivered, and independent of the friction characteristics changing during operation, it is possible to exactly position the rotating plate relative to the distributor plate in the specified flow-through positions.

SUMMARY OF THE INVENTION

The method and apparatus of the present invention includes stop cams on the rotating plate which are arranged in the same angular distances as the ports of the delivery pipes. A mounting catch or click-and-pawl arrangement is also provided on the distributor plate. The stop cams are adapted to rotate through in the forward direction of rotation of the rotating plate under the catch. In the reverse direction of rotation, the stop cams are adapted to strike the catch and, thus, orient the connecting piece in true alignment with the respective port of a delivery pipe.

Preferably, the stop cams arranged on the circumference of the rotating plate each include a front wedge surface designed as an abutting surface for the catch which is under the influence of a spring. Each stop cam also preferably includes a sharp-edged rear surface adapted to strike against an end face of the catch. It is thus possible for the rotating plate to complete a rotation in one direction under the catch, and to then turn back into the impact positions determined by the individual cams against the catch.

When turning back, it is possible for the rotating plate to run with full force against the catch, thus obviating any concerns with possible deposits or different coefficients of friction that exist during positioning. Furthermore, a cleaning effect is attained when the rotating plate is rotated in either the forward or backward directions, since any existing steel fibers which might settle between the two plates during forward rotation, for example, can be released during the reverse rotation.

Despite these measures, it is not possible, in the device according to the invention, when it is used to convey steel fiber concrete, to prevent individual steel fibers from settling (at least temporarily) between the distributor plate and the rotating plate, and it is proposed, therefore, in accordance with the present invention as an alternative, or in conjunction with these measures, that the rotating plate carries on its wide side facing the distributor plate, a rubber elastic gasket (or sealing disk) including an opening formed therein for the connecting piece.

Accordingly, the sealing disk of the rotating plate abuts the distributor plate and, thus, seals the ports of the delivery pipes that are not aligned at that moment with the connecting piece. The steel fibers being deposited between the plates are, at least temporarily, embedded in the rubber elastic material but without reducing the sealing ability thereof. Upon further rotation, the steel fibers are then partially wiped off from the sealing plate, particularly when the sealing plate slides over an edge, such as the edges of the ports of the delivery pipes.

A portion of the steel fibers, however, can permanently become urged into or embedded in the elastic material of the gasket. Therefore, after a certain service life, as with most parts subject to wear, the gasket typically must be replaced. On the other hand, the washer facing the gasket, which is made of hard metal and is arranged on the distributor plate, remains nearly free of wear, despite the fact that steel fibers are deposited in the gasket.

One further advantage of the method and apparatus of the present invention is, that in the vicinity of the contact surface between the rotating plate and the distributor plate, concrete matter and steel fibers flowing radially to the outside and to the inside are continuously carried away by wash water cycles. To this end, first a circumferential ring-type duct adapted to be flooded with wash water is arranged in the radial area between the ball ring mount and the ports of the delivery pipes. Second, in the central region of the rotating plate and the distributor plate, a chamber is defined by a recess penetrating through the contact surfaces of these plates and being adapted to be flooded with wash water.

To adjust the necessary rotational position of the rotating plate, a sensor, preferably a proximity switch, is supported on the distributor plate. The sensor responds to the presence of projections or flaps arranged on the rotating plate in the same angular distances from one another as the ports of the delivery pipes without contacting these projections or flaps. To increase redundancy, the sensor preferably includes two similar sensor elements coupled to each other in a logic OR circuit.

Preferably, to enable the rotational position of the rotating plate to be reset to zero, a reference sensor, which responds to the presence of only one of the projections or one of the flaps, is supported at an angular distance from the position sensor.

The step-by-step action from delivery pipe to delivery pipe can take place according to specific criteria In the case of tunnel work with concrete, particularly extrusion concrete, the absolute pressure reached in the injection chamber is particularly important. Therefore, the turning operation of the rotating plate is preferably initiated based on the sludge pressure measured at the moment the output of a delivery pipe is connected through, whereupon the pump operation is simultaneously switched off.

In principle, however, it is also possible to implement the reversal as a function of volume in accordance with the present invention. This means that the turning operation of the rotating plate is initiated after reaching a specific output volume transported by the respective delivery pipe connected through at the moment, or after reaching a predetermined number of strokes of the pump.

Preferably, when the device of the present invention is constructed as a concrete distributor and is coupled to an advance tunnel working or forward thrust machine, the switching rate between the individual turning operations is also controlled based on the forward speed of the tunnel machine.

In tunnel construction, a tunnel working machine is typically sealed against the ingress of water by means of a grease chamber with steel reinforcements. The pressure within the grease chamber acts as a counterpressure against the penetrating water. When the concrete is injected, care must be taken that the concrete pressure is not higher than the pressure within the grease chamber, since otherwise the grease will be squeezed out and the seal will be destroyed. Therefore, preferably the pump operation is switched off and the turning operation is initiated when a differential pressure, which is the difference between the pressure in the grease chamber and the injection pressure at the discharge end of the respective delivery pipe connected through at that moment, falls below a predetermined value.

Preferably, to minimize the moment of rotation necessary to be overcome during the turning operation, the pump pressure is switched off at each turning operation of the rotating plate. The various ports of the delivery pipes are preferably expediently approached in an arbitrarily defined sequence with the aid of a stored program control.

The device according to the present invention is thus adapted to be advantageously applied in tunnel concrete work when using extrusion of concrete with steel fibers. In this type of work, it is critically important to precisely apportion the concrete into the front form or casing of the tunnel drill, in order to prevent the occurrence of irregularities in the concrete work when rivers, gravel, and water from the surroundings are undercut.

BRIEF DESCRIPTION OF THE DRAWINGS

The present invention is hereinafter explained in further detail based on the embodiment thereof illustrated schematically in the drawings. The Figures illustrate.

DETAILED DESCRIPTION

Figures 1, 2:
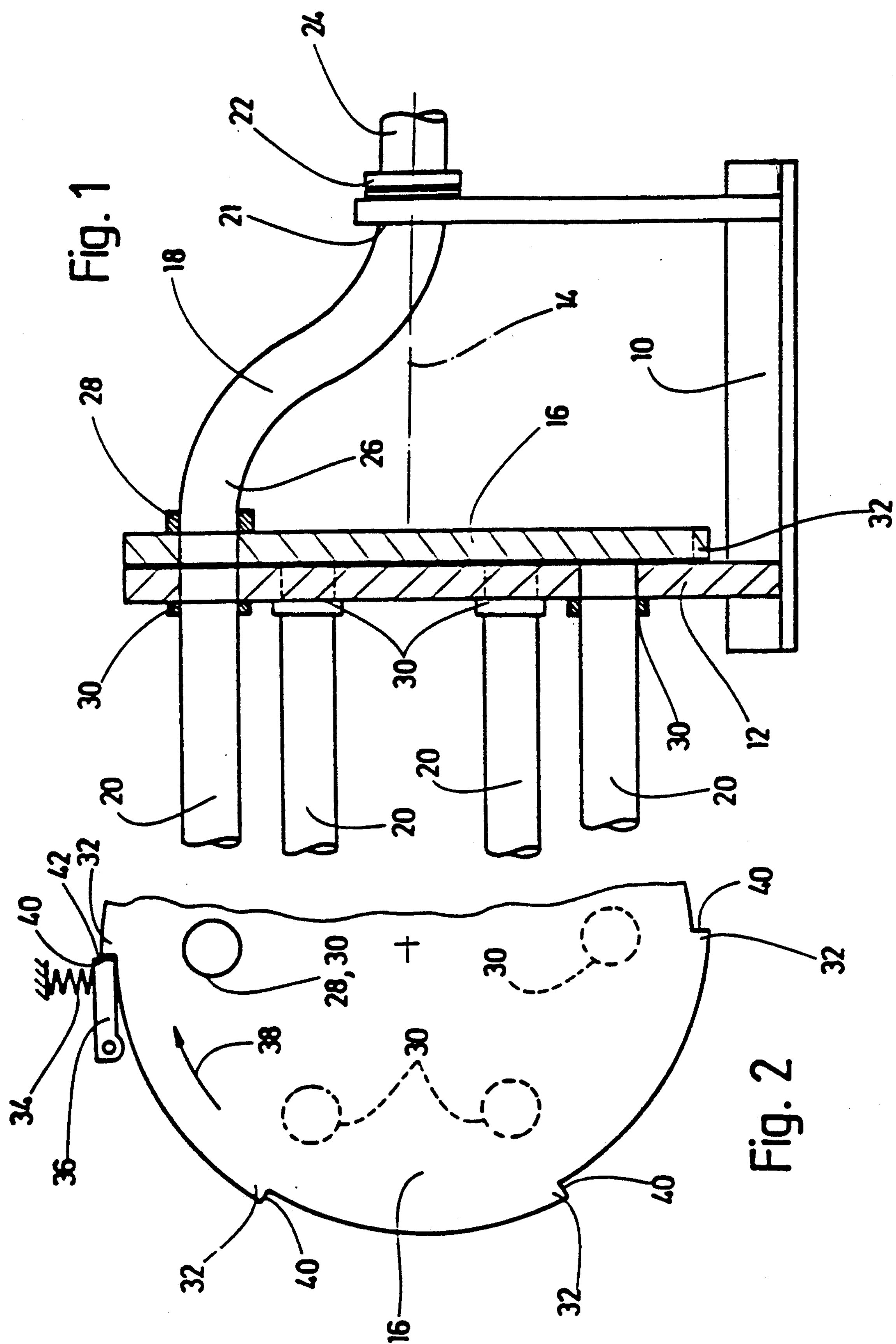
FIG. 1 is a simplified sectional side view of a rotor-distributor device embodying the present invention.
FIG. 2 is a top view of the rotating plate of the rotor-distributor device of FIG. 1.

A rotor-distributor device embodying the present invention is illustrated in the drawings and includes, substantially, a distributor plate 12, which is rigidly coupled to a machine frame 10, a rotating plate 16 which is rotatably supported about an axis 14 on the distributor plate 12, an S-shaped manifold 18 which is mounted by a flange on the rotating plate 16, and several delivery pipes 20 which are supported at the distributor plate 12 by flanges and located at equal angular distances relative to each other.

A first port 21 of the manifold 18, as shown in FIG. 1, is coupled by means of a rotating joint 22 to a feed-pipe connecting piece 24 leading to the pump (not shown). The rotating joint 22 is coaxial with the axis 14. A second port 26 of the manifold 18 is coupled by means of a connecting piece 28 to the rotating plate 16. The second port 26 extends through the rotating plate 16 to the distributor plate 12. The second port 26 is thus adapted to be arbitrarily coupled in fluid communication with the different ports 30 of the delivery pipes 20 in the distributor plate 12.

Stop cams 32 are formed on the peripheral edge of the rotating plate 16 in an angular distance which is the same as the angular clearance between the ports 30 of the delivery pipes 20. The distributor plate 12 includes a catch 36 which is radially biased by a spring 34 toward the stop cams 32. In the forward direction of rotation of the rotating plate 16, as indicated by the arrow 38 in FIG. 2, the stop cams 32 are permitted to rotate through under the catch 36. In the reverse direction of rotation, however, a rear edge 40 of each respective stop cam 32 is adapted to strike against an end face 42 of the catch 36.

Figure 3:
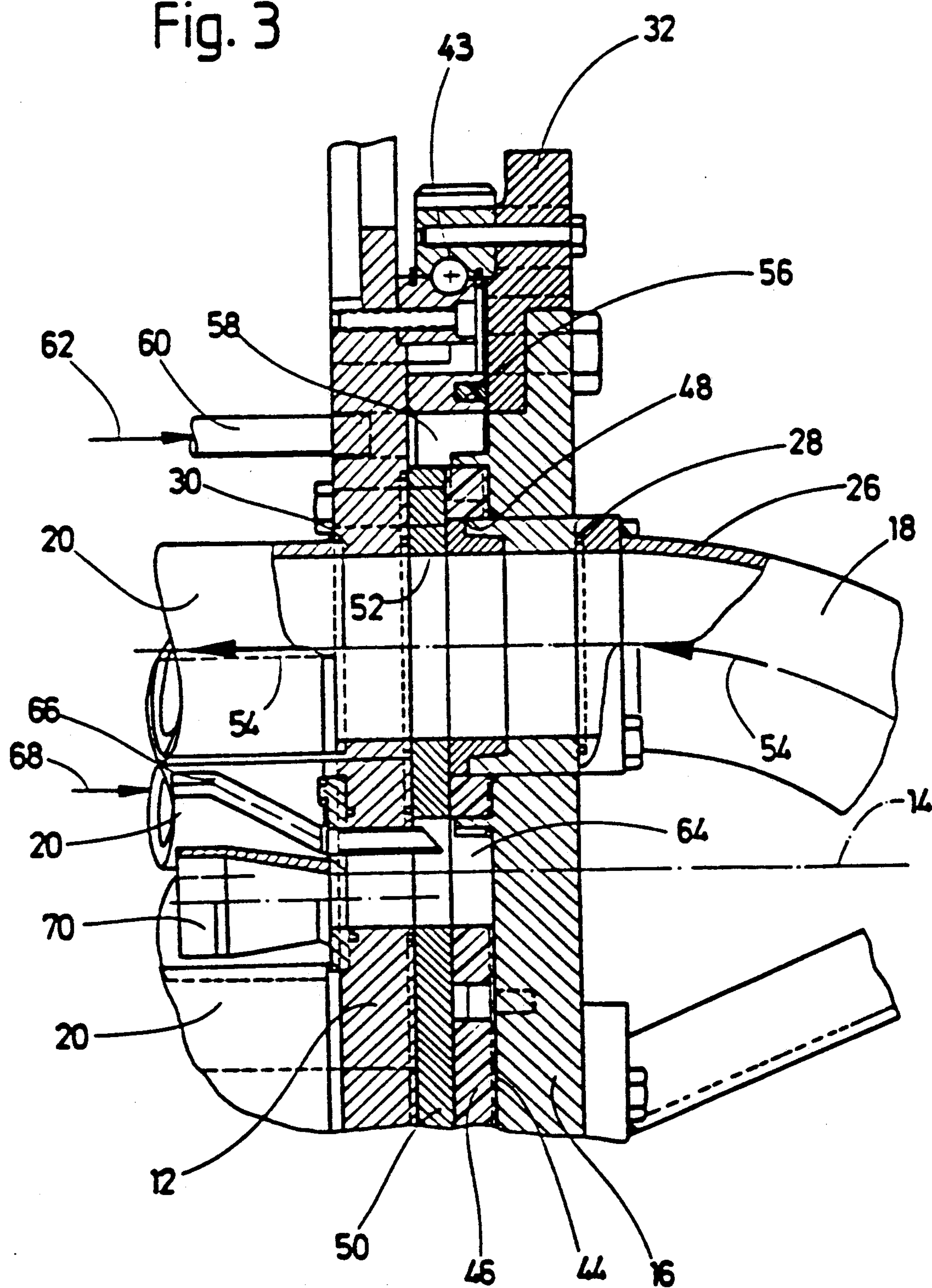
FIG. 3 is a partial sectional representation of details of the rotor-distributor device of FIG. 1, in an enlarged scale.

Turning to the more detailed illustration of FIG. 3, the rotating plate 16 is supported by means of a ball ring mount 43 on the distributor plate 12. The rotating plate 16 includes a rubber disk 46 on its side facing the distributor plate 12. The rubber disk 46 is vulcanized onto a steel plate 44. In the vicinity of the connecting piece 28, the rubber disk 46 has formed therethrough an opening 48. As shown in FIG. 3, the opening 48 is adapted to permit a connecting-part to extend therethrough. The unattached wide lateral surface of the rubber disk 46 abuts against a washer 50. The washer 50 is made of a hard metal and is attached to the inside wide lateral surface of the distributor plate 12. The washer 50 also includes several openings 52 extending therethrough, each corresponding to a respective port 30 of a delivery pipe 20.

In the area outside of the connecting piece 28, the openings 52 are sealed by the rubber disk 46, which is pressed against the washer 50, as shown in FIG. 3. As a result, the concrete located in the delivery pipes 20 is not permitted to flow out of the delivery pipes into the intermediate area between the two plates 12 and 16. The concrete flowing in from the supply line 24 is delivered in the direction of the arrows 54 into a respective delivery pipe 20, which is aligned at the moment with the connecting piece 28.

The ball ring mount 43 is separated by a sealing ring 56 from the area bearing the delivery pipe ports 30. As shown in FIG. 3, a circumferential or annular space 58 is defined between the sealing ring 56 and the mutual periphery of the rubber disk 46 and of the washer 50. The annular space 58 is adapted to be flooded with wash water flowing through a line 60 from the side of the distributor plate 12 in the direction of the arrow 62. The wash water flows through the annular space 58, while carrying along any concrete matter and solid particles that might emerge therein, in a downward direction. The wash water then flows out of the space through an outlet (not shown) and into a drain (not shown).

A chamber 64 is formed by an aperture extending through the central area of the washer 50 and the rubber disk 46, as shown in FIG. 3. The chamber 64 is adapted to be flooded with wash water flowing through a line 66 in the direction of the arrow 68. The wash water thus cleans the chamber 64 and, in turn, is directed over a connecting piece 70 and into a drain (not shown).

We claim:

1. An apparatus for delivering sludge-type matter from a supply line, comprising:

a manifold conduit including a first port on one end thereof and a second port on the other end thereof, the first port being rotatably coupled about an axis of rotation to the supply line and adapted to receive matter flowing therethrough;

a distributor plate including a plurality of third ports extending therethrough;

a plurality of distributor conduits each coupled on one end to a respective third port on one side of the distributor plate and adapted to receive matter flowing therethrough;

a rotating plate rotatably supported on the other side of the distributor plate and rotatable relative thereto about the axis of rotation, the rotating plate including a fourth port extending therethrough and coupled to the second port of the manifold conduit to receive matter flowing therethrough, the fourth port being located to correspond in position to a respective third port on the distributor plate and, thus, adapted to direct matter flowing therethrough into the respective third port and, in turn, into the respective distributor conduit, the rotating plate further including a plurality of stop cams formed on the peripheral edge thereof and axially spaced relative to each other, each stop cam corresponding in position to a respective third port on the distributor plate; and a catch member supported adjacent to the rotating plate and biased against the peripheral edge and, thus, the stop cams thereof, the catch member being adapted to permit the rotating plate to rotate in a first direction relative thereto and adapted to abut a respective stop cam and, thus, prevent rotation of the rotating plate in a second direction relative thereto, each respective stop cam being located so that when abutting against the catch member, the fourth port corresponds in position to a respective third port to permit matter to flow therethrough.

2. An apparatus as defined in claim 1, wherein each stop cam includes a substantially wedge-shaped surface on one side thereof adapted to permit the catch member to slide thereon upon contact therewith and, thus, permit the rotating plate to rotate in the first direction, and a stop surface on the other side thereof adapted to abut the catch member and, thus, prevent the rotating plate from rotating in the second direction.

3. An apparatus as defined in claim 1, further comprising:

a gasket member supported between the rotating plate and the distributor plate and including a first aperture formed therethrough, the first aperture being located to correspond in position to the fourth port to permit matter to flow therethrough, the gasket member being made of a resilient material and pressed between the rotating plate and distributor plate to prevent matter flowing through the fourth port from flowing between the rotating and distributor plates and to seal the third ports not corresponding in position to the fourth port.

4. An apparatus as defined in claim 3, further comprising:

a metal plate located between the gasket member and the rotating plate, the gasket member being vulcanized onto the metal plate.

5. An apparatus as defined in claim 3, further comprising:

a metal washer coupled to the distributor plate between the gasket member and the distributor plate, the metal washer including a plurality of second apertures extending therethrough, each second aperture corresponding in position to a respective third port to permit matter to flow therethrough.

6. An apparatus as defined in claim 1, further comprising:

a ball bearing mount coupled between the distributor plate and the rotating plate and adapted to permit the rotating plate to rotate about the axis of rotation relative to the distributor plate, the rotating plate and distributor plate further defining a first fluid chamber therebetween, the first fluid chamber extending between the ball bearing mount and the third ports of the distributor plate and adapted to receive a stream of fluid flowing therethrough to remove any particles therefrom.

7. An apparatus as defined in claim 6, wherein the distributor plate includes a first fluid hole extending therethrough in fluid communication with the first fluid chamber and adapted to permit fluid to flow therethrough into the first fluid chamber, and a second fluid hole extending therethrough in fluid communication with the first fluid chamber and located below the first fluid hole, the second fluid hole being adapted to permit fluid to flow therethrough from the first fluid chamber to remove any particles therefrom.

8. An apparatus as defined in claim 6, further comprising:

a gasket member supported between the rotating plate and the distributor plate and including a first aperture formed therethrough, the first aperture being located to correspond in position to the fourth port to permit matter to flow therethrough, the gasket member being made of a resilient material and pressed between the rotating plate and distributor plate to prevent matter flowing through the fourth port from flowing between the rotating and distributor plates and to seal the third ports not corresponding in position to the fourth port; and a metal washer coupled to the distributor plate between the gasket member and the distributor plate, the metal washer including a plurality of second apertures extending therethrough, each second aperture corresponding in position to a respective third port to permit matter to flow therethrough, wherein one side of the first fluid chamber is defined by the mutual peripheral surfaces of the gasket member and the metal washer.

9. An apparatus as defined in claim 6, further comprising:

an annular sealing member seated between the distributor plate and the rotating plate and extending between the ball bearing mount and the first fluid chamber to prevent fluid from flowing therebetween.

10. An apparatus as defined in claim 5, wherein the distributor plate and rotating plate define a second fluid chamber therebetween in a central area thereof, the second fluid chamber being adapted to receive fluid therein to remove any particles therefrom.

11. An apparatus as defined in claim 10, wherein the second fluid chamber is defined by an aperture extending through the sealing gasket and metal washer.

* * * * *